Figure 3:
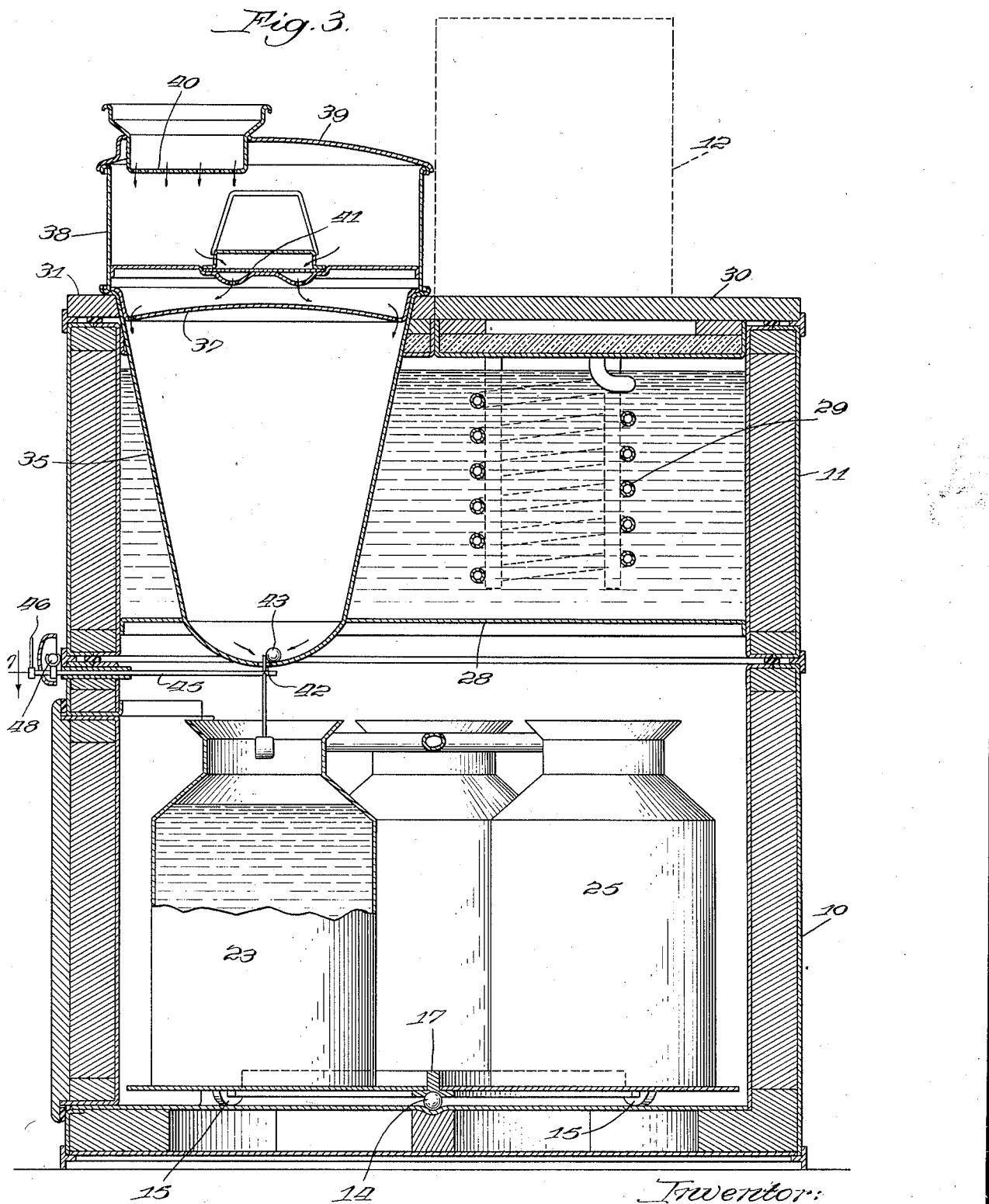

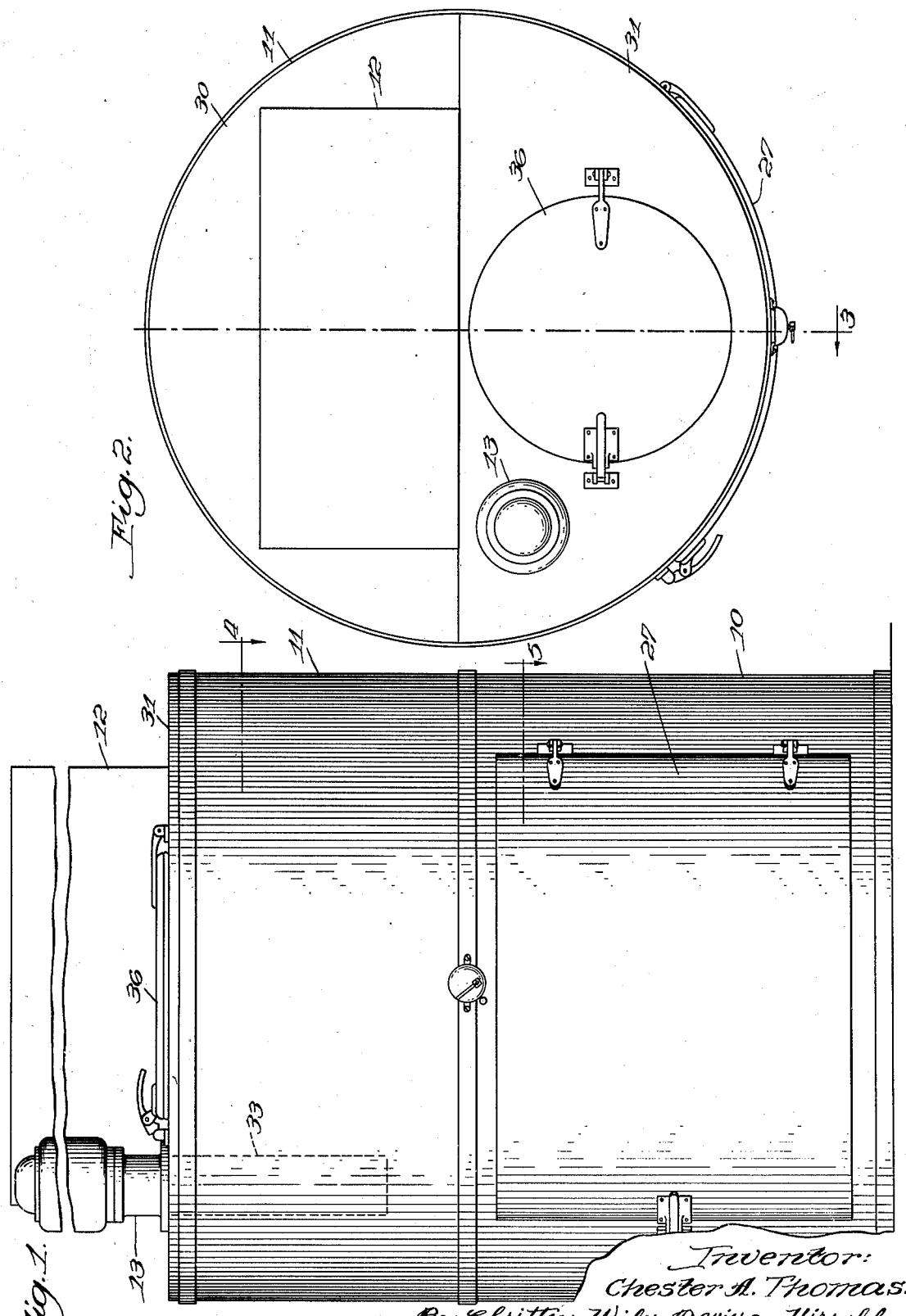

Dec. 12, 1944.  C. A. THOMAS  2,365,024
MILK COOLER
Filed March 31, 1941  4 Sheets-Sheet 2

Inventor:
Chester A. Thomas.
By Chritton, Wiles, Davies & Hirschl.
Attys.

Dec. 12, 1944.  C. A. THOMAS  2,365,024
MILK COOLER
Filed March 31, 1941  4 Sheets-Sheet 3
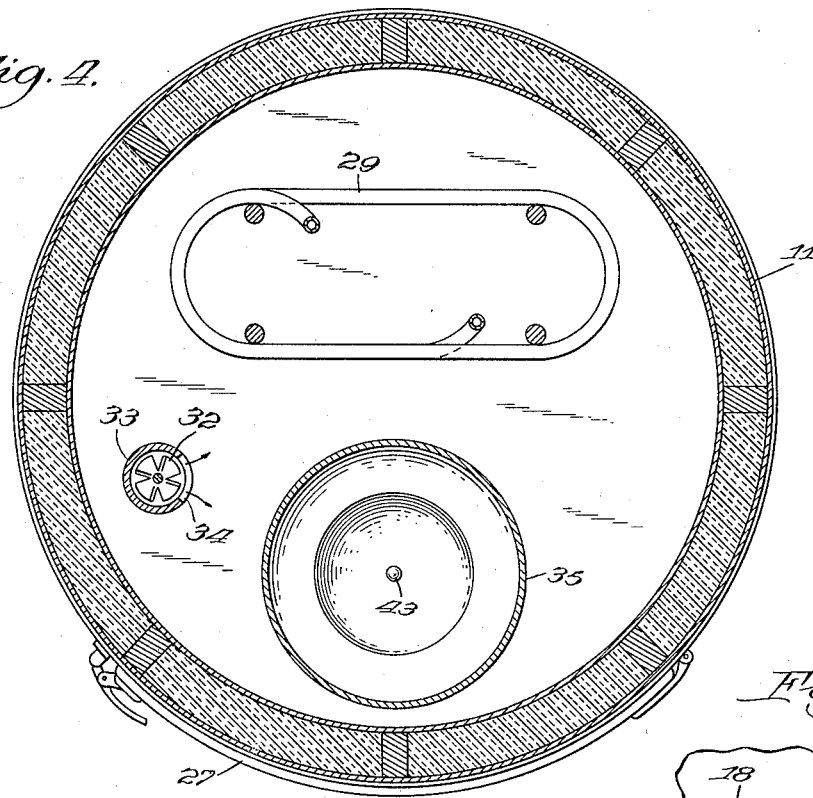
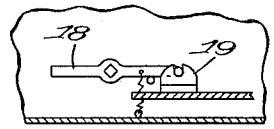
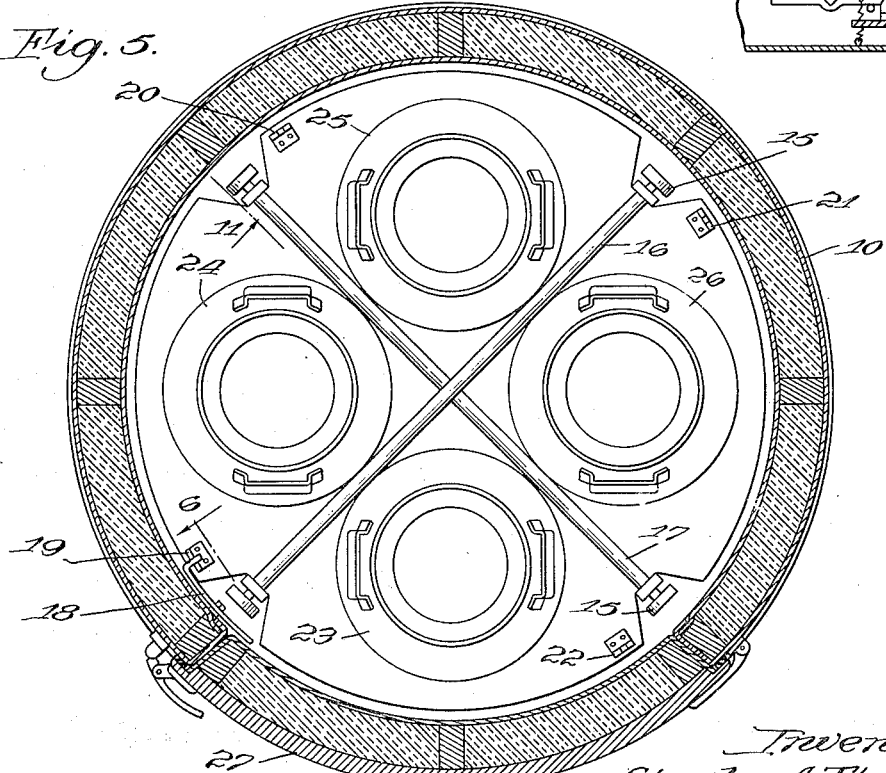
Inventor:
Chester A. Thomas.
By Chritton, Wiles, Davies and Hirschl. Attys.

Dec. 12, 1944.  C. A. THOMAS  2,365,024
MILK COOLER
Filed March 31, 1941    4 Sheets-Sheet 4
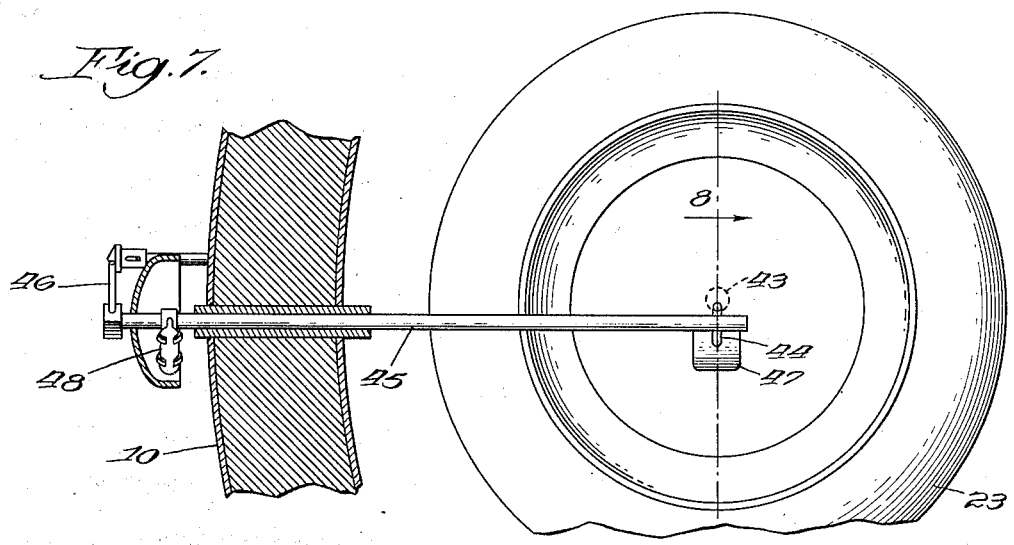
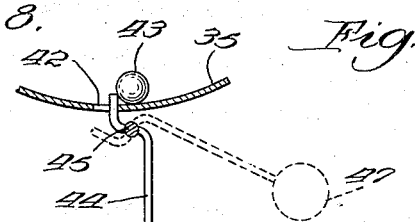
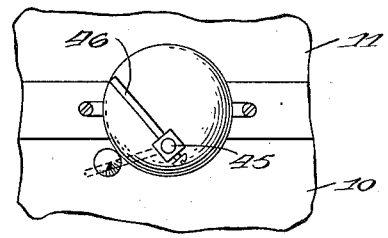
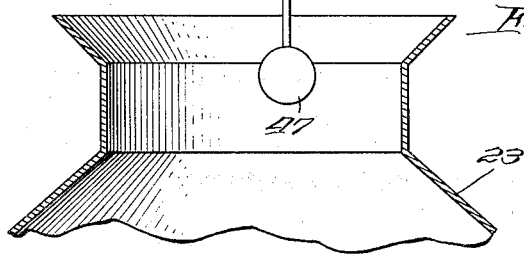
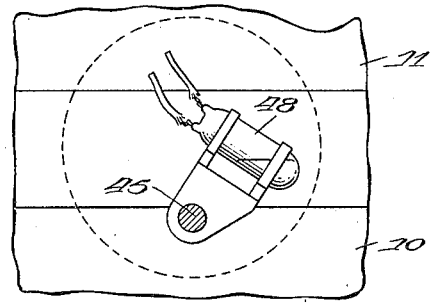
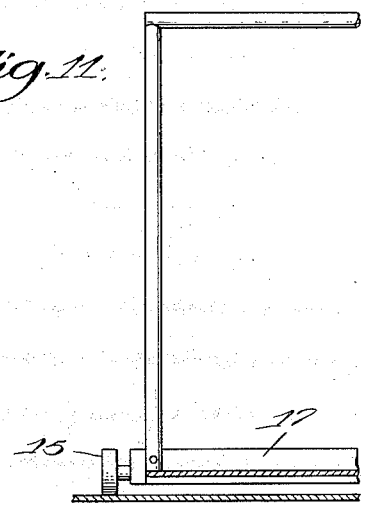
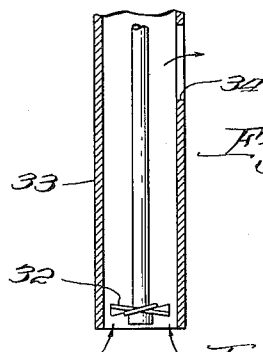
Inventor:
Chester A. Thomas.
By Britton, Wiles, Davies & Hirschl.
Attys.

Patented Dec. 12, 1944

2,365,024

UNITED STATES PATENT OFFICE 2,365,024

MILK COOLER

Chester A. Thomas, Crystal Lake, Ill., assignor to Babson Bros. Co., a corporation of Illinois Application March 31, 1941, Serial No. 386,175

7 Claims. (Cl. 31—4)

This invention relates to a milk cooler, and more particularly to a cooler comprising a single unit for rapidly cooling milk, and then for storing it and maintaining its temperature for long periods.

One feature of this invention is that it provides an improved single unit for precooling and storing milk; another feature of this invention is that the precooling means is adapted to be readily cleaned and thoroughly sterilized; another feature of the present invention is that by use of a milk cooler of my improved type the milk may be filtered, practically instantaneously cooled, and stored in a container in a cool place with the absolute minimum of handling and exposure; another feature of this invention is that the milk container is already in the storage compartment when it is filled with precooled milk; yet another feature is that valve means is provided for shutting off the flow of milk to the container when a desired level has been reached therein, and indicating means are operable at the same time; other features and advantages of this invention will be apparent from the following specification and the drawings, in which:

Figure 1 is a front elevational view, partially broken away, of a milk cooler embodying my invention; Figure 2 is a top plan view of such a cooler; Figure 3 is a vertical sectional view along the line 3 of Figure 2; Figure 4 is a horizontal sectional view along the line 4 of Figure 1; Figure 5 is a horizontal sectional view along the line 5 of Figure 1; Figure 6 is a fragmentary detail view of the turntable latch mechanism, along the line 6 of Figure 5; Figure 7 is a fragmentary horizontal view, partially in section, showing one of the milk coolers and the valve and indicating means; Figure 8 is a fragmentary vertical sectional view along the line 8 of Figure 7; Figure 9 is a detailed front elevational view of the valve control mechanism; Figure 10 is a detail view of a switch associated with the valve means; Figure 11 is a fragmentary vertical view along the line 11 of Figure 5; and Figure 12 is a detail view of a part of the water circulating pump.

Milk is one of the most perfect foods known when it is of good quality, but it is also a food very susceptible to spoilage and a high rate of bacterial growth. In order that it may reach the consumer in good condition, it is necessary that the milk be rapidly and uniformly cooled to a temperature in the neighborhood of 40°, and preferably a few degrees below this, as soon as possible after milking; and the greatest care must be exercised to see that bacterial contamination is prevented. Even though milk is subsequently pasteurized at a processing plant, the rapid and early cooling and the protection from contamination are major factors in the subsequent quality of the milk.

At present the conventional method of cooling milk is by immersing a milk can in a body of cold water, kept cold either by ice, mechanical refrigeration, or by being replenished by spring water, well water, or other natural cold water. Where a given body of water is intended to contain a certain number of milk cans or containers, it is obvious that the use of fewer cans results in the outside water level being lower than the milk level in the cans, and this in turn results in poor cooling of the top milk. Cooling of fresh, hot milk by immersing the can in water at a temperature of 35° to 40° is slow enough at best, requiring several hours; and if the level of the outside water is several inches below the level of the milk in the can the temperature of the top milk may remain above 50° for eight hours or more. This results in unbelievable multiplication of bacterial organisms in the milk, with consequent poor quality of the entire contents of the can. It has been found that a temperature of 50° F. presents practically no restraint on bacterial growth; that bacterial organisms still multiply at 45°; and that it is necessary to hold the milk at a temperature of 40° or lower to hold the bacterial count substantially stationary. Immersion cooling of the milk containers does not achieve the necessary cooling of all of the milk unless the water level is very carefully watched; and because of the variation of the number of cans to be placed in the cooler from time to time, this is not possible as a practical proposition.

Another difficulty with immersion cooling is that the milk cans must be lifted to a considerable height in being placed in or removed from the water bath, a strenuous job where ten gallons of milk must be lifted to shoulder height each time. Moreover, in lifting the cans in and out of the bath they are frequently tipped or the milk slopped over for one reason or another, so that the water bath soon contains an undesirable addition of milk. The milk in the bath soon gets rancid and, where mechanically frozen ice blocks are used to keep the water bath cold, the water not only has to be dumped and replaced about once a week, but the ice has to be melted off of the refrigerating coils to get rid of the milk in it. Even under the best of conditions, with the water bath kept at a temperature in the neighborhood of 35° and its level being exactly proper, it takes two to four hours to cool the milk to a temperature below 40°. In an effort to rapidly cool the milk various means have heretofore been used for rapidly dropping the temperature of the milk before it is placed in the cans. These have been open to serious objections, however, principally because they usually comprise large open surfaces, difficult to clean, tending to contaminate the milk; and because unless extreme care was exercised the milk was generally run over the top of the can in filling it through precooling apparatus.

My invention obviates these and other difficulties by providing as a single unit means for precooling the milk and delivering it directly to a container in a cooled storage space, filtering, substantially instant cooling, and storage of the milk in the can in a cold place being accomplished with only one pouring of milk, directly from the milking pail, and with all subsequent milk travel being inclosed. Moreover, the precooling means is so constructed and arranged as to be readily and easily sterilized, and has valve mechanism and indicating means associated with it preventing overfilling of the cans. By the use of a milk cooler of my improved type a pail of milk has been cooled to a temperature in the neighborhood of 38° in the matter of about four minutes, and, even though left in the storage compartment for several days, has remained at a temperature of 41° or lower. This is, of course, practically ideal from a standpoint of keeping the milk at high quality; and handling and maintenance by the farmer is reduced to a minimum.

In the particular embodiment of my invention illustrated herewith the milk cooler comprises a single unit including four principal portions. These are a lower cylindrical milk storage portion 10; an upper cylindrical portion 11; and portions 12 and 13 for mechanically refrigerating and agitating water in the upper portion 11. As may be best seen in Figures 3 and 5, the lower storage portion 10 has heat insulated bottom and side walls and an open top adapted to have the upper portion placed thereover. The bottom of the storage compartment is provided with a readily rotatable turntable, here shown as mounted on the central ball bearing 14 and as provided with a plurality of supporting wheels 15 near its periphery. This turntable is adapted to support a plurality of milk containers comprising the conventional milk cans. It is provided with some means, here shown as angle irons 16 and 17, serving to properly locate the containers at desired points on the turntable. With the arrangement here shown each container is merely pushed in until it is stopped by contact with portions of each of the two angle irons. Latch means or stop means is also provided so that the turntable may be readily turned one-quarter revolution at a time (where it is desired to hold four containers), this means being here shown as a spring-urged latch lever 18 adapted to cooperate with any of the four stops 19, 20, 21 and 22. When the latch is in engagement with the recess provided by any one of the stops one of the four milk containers (here indicated as 23, 24, 25 and 26) is automatically located in proper position beneath a milk delivery opening which will be hereafter described. When one can, as the can 23, has been filled the latch is manually released and the turntable swung or rotated a quarter turn until the latch engages one of the other stops, whereupon the next can is in position for filling. The storage portion is also provided, of course, with a door for insertion and removal of the milk cans, this being here indicated as 27. It will be seen that this door comprises a relatively small portion of the wall area of the storage compartment, having a width slightly less than one-quarter of the circumference of such compartment and a height only a little greater than that of the milk cans. This is particularly desirable, in order to prevent loss of all the cold air in the storage compartment when a can is inserted or removed therefrom.

The upper portion 11 is also cylindrical, and is provided with heat insulated top and side walls, but with a highly heat conductive bottom here shown as a sheet metal plate 28. The upper portion is principally a storage vat or compartment for water, or a similar heat-storing liquid. The means for keeping the water cold, previously merely indicated in general as 12, includes conventional electrically driven refrigerant compressing and circulating means, and evaporator or cooling coils 29 depending into the water. It will be noted that the top of the upper portion 11 is divided into two sections; and that the back section 30 carries all parts of the cooling means, so that this is all removable as a unit. During periods when no precooling of the milk is being done the evaporator coils 29 build up an ice block around themselves, this serving as what may be termed a cold storage or carry-over maintaining the water in the bath at a temperature of 35° or lower even when large quantities of milk are passed in heat exchange with the water to precool the milk before it is delivered to the cans in the storage compartment.

To assist in maintaining a uniform low temperature in the water during precooling of the milk means for circulating it is provided, heretofore indicated in general as 13. This unit is readily insertable into and removable from an opening in the front section 31 of the insulated top, and comprises an electric motor driving a pump element or propellor 32 located in the tube 33. The lower end of the tube is open, and one side of the tube near its upper end is provided with another opening 34, as may be seen in Figure 12. During rotation of the pump element 32 water is drawn in one opening and forced out the other to keep the water bath in movement. It will be noted that the upper portion 11 is merely placed in position on the lower portion 10, so that all of the portions of the cooling unit are readily removable and separable from each other for cleaning, repair, or movement. The fact that the upper and lower portions are separable and cylindrical, for example, enables the cooling unit to be readily moved into a barn through a narrow door.

As will be best seen in Figure 3, the precooling means comprises a cone 35 of sheet metal, preferably stainless steel. This cone has its portion of larger diameter open and facing up, this open end being closed by the heat insulating cover 36 (shown in Figure 2) when the precooler is not in use. When the precooler is in use the cover 36 is opened and the top of the cone covered with a distributor pan 37 and a filter pan 38 having a cover 39 and strainer 40 thereover. Fresh milk which has just been milked from the cow, whether mechanically or by hand, is poured directly from the pail into the strainer 40 and passes through the perforations in the bottom thereof, this removing any large particles of foreign matter which might possibly be present. It then flows down through a filter element 41 in the bottom of the filter pan 38, and onto the center of the upwardly arched bottom of the distributor pan 37. The milk flows outwardly fairly uniformly over this surface, and then flows down through a plurality of openings around its periphery to form a thin well-distributed film of milk flowing down the sides of the precooling cone 35. These side walls are of fairly thin metal of good heat conductivity, as for example stainless steel of a thickness of .02 of an inch, and the outer surface of these walls is in contact with the water in the water storage chamber. The heat of the milk is thus exchanged with the water, and by the time the milk has reached the apex of the cone it has reached a temperature of about 38 or 39°. The entire time consumed in a complete pail of milk passing from the strainer to the bottom or apex of the cone 35 is generally in the neighborhood of four minutes, so that it is apparent that the milk is substantially instantaneously cooled to a temperature in the neighborhood of 40° F.

The bottom of the cone (rounded to facilitate cleaning) projects through the bottom plate 28 of the water storage tank, as may be best seen in Figure 3, and is provided with a single opening 42 for delivering the milk to a container. As may be best seen in Figures 7 and 8, valve means is provided for closing this opening, this means being either automatically or manually operable. The valve element itself is a steel ball 43 of appropriate diameter adapted to drop into and close the opening 42 except when it is held out of the opening by the upper end of a rod member 44. This rod member is rigidly mounted on and rotatable with a horizontal shaft 45 extending to the outside of the unit, so that manual rotation of the shaft by means of the handle 46 can close the valve and keep it closed. The rod member 44 is also provided with means for automatically closing the valve, here shown as a float 47 on its lower end. When a container is in the proper position beneath the discharge opening 42 and no pressure is being exerted on the handle 46 the parts are in the position shown in solid lines in Figure 8. As the milk rises in the can 23, however, and approaches the top of the can, it moves the float 47 upwardly and to the right. By the time the milk has reached a desired level only slightly below the top of the can, the float has moved far enough up and to the right that the ball 43 closes the opening 42, and thereafter any further milk passing down from the filter pan remains in the precooling cone 35, which acts as a temporary storage receptacle until a new can is placed in position.

As may be best seen in Figures 7 and 10, the shaft 45 has mounted thereon a mercury switch 48, rotation of the shaft by movement of the float 47 closing the circuit through this switch just before the ball or valve member 43 closes the opening 42. The circuit through this switch is energized in conventional manner and used to actuate a buzzer or other signalling means. Immediately upon this indication it is known that the can 23 is full, and thereupon the door 27 is opened, the latch manipulated, and the turntable turned a quarter revolution to bring a fresh can in position under the delivery opening 42. During the movement of the cans in the storage compartment the float 47 is manually held in the position shown in dotted lines in Figure 8 (through use of the handle 46); so that the valve operating means provides no interference with the movement of the cans. As soon as a new can is in position the handle 46 is released and the door closed. Downward movement of the float 47 upon release of the handle pushes the ball 43 out of its position closing the delivery opening, and any milk in the cone 35 then flows into the new can. Further pails of milk are poured into the top of the strainer 40 as they are secured during the course of the milking, until the second milk can is filled to the desired level and an indication again heard, whereupon the process is repeated.

It will be apparent that the milk cooler here disclosed provides a very convenient and effective method for substantially instantaneously cooling milk to a temperature in the neighborhood of 40°, immediately after it is milked; and for keeping the milk at such temperature for any desired length of time. Moreover, it is apparent that all of the milk is instantly brought to the same uniform desirable temperature, and that there is no necessity for ever changing the water in the upper storage compartment. Moreover, the milk unit will provide proper cooling for a dairy herd delivering up to eighty gallons of milk a day. The milk drawn in the evening milking is, of course, left in the cans in the storage compartment all night. When the morning milking is being done the four filled cans are removed from the lower portion of the milk cooler (preferably being covered with canvas, a blanket, or the like, to keep them cool), and four empty cans placed on the turntable are then filled with the result of the morning's milking. All eight cans, with the milk in all of them at a temperature in the neighborhood of 40°, can then be loaded on the farm truck for transfer to the nearest pick-up station or processing plant.

While I have shown and described certain embodiments of my invention, it is to be understood that it is capable of many modifications. Changes, therefore, in the construction and arrangement may be made without departing from the spirit and scope of the invention as disclosed in the appended claims.

I claim:

1. A milk cooler of the character described, comprising a unit including: a lower housing portion having its side and bottom walls heat insulated, and adapted to store a plurality of milk containers; an upper portion having its side and top walls heat insulated and its bottom heat conductive, said upper portion constituting a storage tank for a considerable quantity of liquid, the liquid being adapted to keep the lower portion cool by heat transfer through said bottom; means for keeping said liquid cold; and means for delivering fresh milk to one of the containers, said means having a substantial portion thereof disposed in the liquid and effecting a heat exchange between the milk and the liquid to rapidly cool the milk.

2. Apparatus of the character claimed in claim 1, wherein the last mentioned means comprises a metal cone having the major portion of its wall area in contact with the liquid, and means at its large end for distributing milk about its walls, the cone being adapted to have the milk poured into its large end and to deliver it from an opening at its apex, the interior of the cone being readily accessible from above for cleaning, without access to said lower storage portion.

3. Apparatus of the character claimed in claim 1, wherein the cooling means includes refrigeration coils immersed in the liquid, and means for circulating the liquid.

4. Apparatus of the character claimed in claim 1, wherein the lower portion has a turntable in the bottom thereof facilitating movement of the containers.

5. A milk cooler of the character described, comprising a unit including: a lower cylindrical portion having its side and bottom walls heat insulated, and adapted to store a plurality of milk containers; an upper cylindrical portion having its side and top walls heat insulated and its bottom heat conductive, said upper portion constituting a storage tank for a considerable quantity of liquid, said upper portion including means for passing milk therethrough, in heat exchange relation with the liquid, to deliver it to a container; and a liquid cooling portion adapted to keep the liquid cold, all of said portions being readily separable.

6. A milk cooler of the character described, comprising a unit including: a lower cylindrical portion having its side and bottom walls heat insulated, and adapted to store a plurality of milk containers; an upper cylindrical portion having its side and top walls heat insulated and its bottom heat conductive, said upper portion constituting a storage tank for a considerable quantity of liquid, said upper portion having therein a metal cone having the major portion of its wall area in contact with the liquid and having means at its large end for distributing milk about its walls, the cone being adapted to have the milk poured into its large end and to deliver it from an opening at its apex to a container, the interior of the cone being readily accessible from above for cleaning, without access to said lower storage portion; means for keeping the liquid cold; and valve means so constructed and arranged as to automatically close said opening when the container has been filled to a desired level.

7. Apparatus of the character claimed in claim 6, wherein the lower portion has a door of relatively small area for removal of the containers, and a turntable in the bottom thereof.

CHESTER A. THOMAS.